Figure 1:
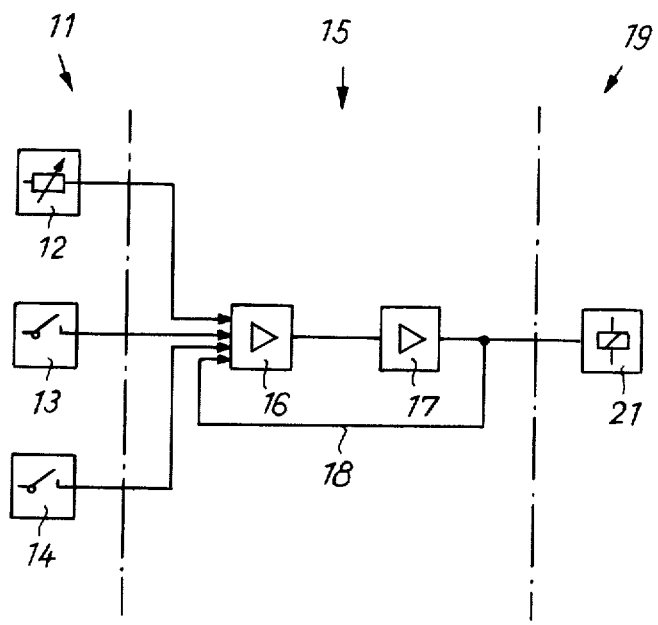

United States Patent [19]
Wurst

[11] 3,886,818
[45] June 3, 1975

[54] CONTROL SYSTEM FOR THE MAIN CONTROL PRESSURE OF A MOTOR VEHICLE AUTOMATIC TRANSMISSION

[75] Inventor: Bert Wurst, Moglingen, Germany
[73] Assignee: Robert Bosch G.m.b.H., Stuttgart, Germany
[22] Filed: Sept. 17, 1973
[21] Appl. No.: 397,760

[30] Foreign Application Priority Data
Oct. 14, 1972 Germany............................ 2250440

[52] U.S. Cl................................... 74/866; 74/851
[51] Int. Cl. ...................................................... B60k
[58] Field of Search ............. 74/851, 854, 866, 844, 74/852

[56] References Cited
UNITED STATES PATENTS
3,732,754  5/1973  Mori..................................... 74/866

*Primary Examiner*—Samuel Scott
*Assistant Examiner*—Frank H. McKenzie, Jr.
*Attorney, Agent, or Firm*—Flynn & Frishauf

[57] ABSTRACT

A voltage and temperature stabilized transistor circuit controls a magnetic valve regulating the hydraulic pressure in response to an electric signal produced by a potentiometer actuated by the engine throttle or accelerator pedal, the system having a desired overall non-linear translation characteristic. The circuit operation is modified by criteria relating to exhaust gas condition, as provided by switches respectively operated by spark retard-advance setting and a valve controlling exhaust gas recycling. Continuous low-amplitude oscillation of the magnetic valve to prevent friction hysteresis is provided by supplying to the circuit a small alternating voltage derived from the ignition coil.

18 Claims, 2 Drawing Figures

CONTROL SYSTEM FOR THE MAIN CONTROL PRESSURE OF A MOTOR VEHICLE AUTOMATIC TRANSMISSION

This invention relates to a control system for the main control pressure of a hydraulically operated automatic transmission of a motor vehicle. Most of the usual motor vehicle automatic transmissions have a set of planetary gears that serve to shift from one gear to another. To shift gears in each case one single unit of the planetary gear set, for example the "sun" or the "planets" or the rack, is separately braked to a stop by means of hydraulically actuated couplings or brake bands. By applying a brake to a particular part of the planetary gear set, the transmission is put into a particular gear.

The shifting from one gear to another should take place without jerks, in order to improve riding comfort. The wear on the couplings and brake bands, moreover, must be limited in order to prolong the life of the mechanism. In order to fill these requirements, the hydraulic pressure used to actuate these couplings or brake bands is caused to vary with the position of the engine throttle or — which is the same thing — with the position of the accelerator pedal. The position of the throttle or of the accelerator pedal is therefore commonly used to control the pressure for actuating the couplings or brake bands of the transmission, which is generally referred to as the main control pressure of the automatic transmission.

It is an object of this invention to provide a control of the main hydraulic control pressure of a transmission system from the position of the engine throttle having the positiveness, flexibility and accuracy characteristic of electric control systems.

SUBJECT MATTER OF THE PRESENT INVENTION

Briefly, an input transducer is provided, typically a potentiometer, by which the position of the throttle can simply be converted into an electrical magnitude with any desired input/output relation, after which this electrical magnitude is amplified and used to control the main control pressure of the transmission, typically by a magnetic valve, the evaluating circuit which provides the amplification being equipped with means to counteract variations in supply voltage and variations in ambient temperature and being provided with a suitable feedback. Protection against over-voltage and against misconnection of the power supply is also included.

A particular advantage of this control system is that the input transducer can be so designed as to provide a relation between the throttle position and the main control pressure, which is non-linear and particularly suited to the particular vehicle type. Another advantage is that in particular embodiments of the control system provision may be made for modifying its behavior in response to an exhaust gas composition criterion, and also in response to change of the spark timing applied to the engine.

The input transducer is so connected to the evaluation circuit into which it works that if one or more of the leads of the transducer are interrupted, the control system will bring the main control pressure to its maximum value. Finally, in order that the excellent control characteristic available by the present invention free of effects of voltage variations and temperature variations should not be spoiled by friction hysteresis in the magnetic valve that is the output transducer of the system, an alternating current is superimposed upon the control current in the evaluating circuit. This alternating current can conveniently be obtained from the spark-coil of the motor vehicle's ignition system.

Figure 2:
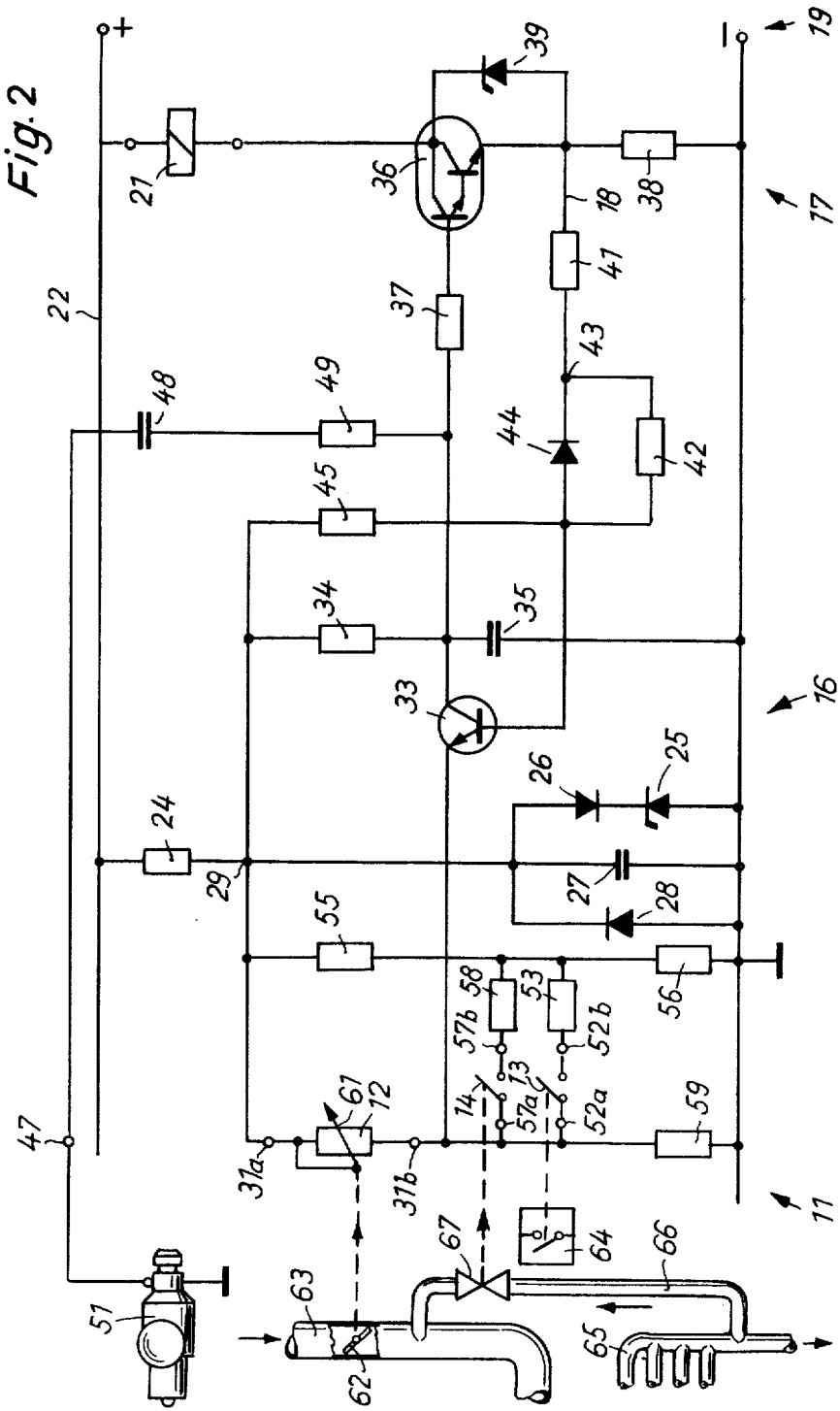

The invention is further described by way of example with reference to the drawings, in which:

FIG. 1 is a block diagram of a control system in accordance with the invention, and FIG. 2 is a circuit diagram of such a control system.

The block diagram of FIG. 1 shows an input transducer means 11 containing three transducer elements, a variable resistor 12 responsive to throttle position, a first switch 13 responsive to the spark advance-retard position and a second switch 14 responsive to the position of a mechanism controlling the amount of exhaust gas recycling. The output of the input transducer means 11 serves as the input to an evaluation circuit means 15 that comprises a regulating amplifier 16 to which the various outputs of the input transducer means are supplied, followed by an output amplifier from the output of which a feedback path 18 leading to the input of the regulating amplifier 16 is connected. The output of the output amplifier 17, which is the output of the evaluating circuit means 15, operates an output transducer means 19 which includes the magnetic valve 21.

FIG. 2 is a circuit diagram showing in more detail the control system shown in FIG. 1. To provide a reliable electric control system in a motor vehicle, it is necessary to protect the evaluation circuit, and particularly the regulating amplifier, against variations of supply voltage by the provision of a regulated voltage. Therefore, between the positive voltage bus 22 connected to a voltage source not shown in the drawing, and the negative voltage bus 23 which is grounded to the chassis to which the other pole of the voltage source is connected, there is a series connection of an input series resistor 24 and a shunt regulator in the form of a first Zener diode 25 having a first ordinary diode 26 interposed between it and the series resistor and poled in its conducting direction. In parallel with the series combination of the Zener diode 25 and the other diode 26 is a capacitor 27 and a second diode 28 poled so as to be normally nonconducting. The connection point 29 between the series resistor 24 and the parallel connection just described of the elements 25,26,27 and 28 is a point of stabilized voltage. To this point 29, one input terminal 31a of the evaluation circuit 15 is connected. One of the output leads of the variable resistor 12 is connected to this input terminal. The other output lead of the variable resistor 12 is connected to the input terminal 31b of the evaluation circuit. A resistor 59 is connected between the input terminal 31b and the negative voltage bus 23. The emitter electrode of a regulating transistor 33 is also connected to the input terminal 31b. The collector terminal of the regulating transistor 33 is connected over a collector-resistor 34 to the stabilized voltage bus 29, and is connected also to a capacitor 35 the other side of which is connected to the negative voltage bus 23.

A coupling resistor 37 is connected between the collector of the regulating transistor 33 and the base of an output transistor 36. This output transistor 36 is preferably in the form of a compound transistor, for example in the form of a Darlington circuit. An emitter-resistor 38 is connected between the emitter of the output transistor 36 and the negative voltage bus. The winding of the magnetic valve 21 is connected between the collector of the output transistor 36 and the positive voltage bus 22. Two resistors in series or a tapped resistor 41,42 are connected to provide feedback between the emitter of the output transistor 36 and the base of the regulating transistor 33. The tap 43 of this resistor combination serves for connecting a third diode 44 across the resistor (or resistor portion) 42. A resistor 45 is connected between the stabilized voltage bus 29 and the base of the regulating transistor 33. The collector of the regulating transistor 33 is connected over the series combination of a resistor 49 and a capacitor 48, to an additional input terminal 47, to which is connected the spark-coil 51 of the ignition system of an internal combination engine (not shown in the drawing).

The switching path of the switch 13 is connected to a second additional input of the evaluating circuit 15 provided by the input terminals 52a and 52b. The input terminal 52a is connected to the emitter of the regulating transistor 33, while the input terminal 52b is connected over a resistor 53 to a connection 54 between two resistors 55 and 56, which are connected in series between the stabilized voltage bus 29 and the negative voltage bus 23.

The switching path of the second switch 14 is connected to a third additional input 57 of the evaluating means which comprises the input terminals 57a and 57b. The input terminal 57a is connected to the emitter of the regulating transistor 33, whereas the input terminal 57b is connected over a resistor 58 to the previously described connection 54.

The slider 61 of the variable resistor 12 is mechanically connected to the engine throttle 62, which is located in the intake tube 63 of the internal combustion engine not shown in the drawing. The first switch 13 is preferably connected mechanically with the ignition distributor 64, so as to be responsive to the spark advance-retard position. A duct 66 branches off from the exhaust manifold 65 to provide recycling of exhaust gas which is accomplished, for example, by passing the exhaust gas through a slide valve 67 into the intake pipe 63. The slide valve 67, which is controlled by means not shown, is preferably connected mechanically to the second switch 14.

In the control system of this invention for controlling the main control pressure of a hydraulically actuated automatic transmission, the position of the engine throttle or of the accelerator pedal is determined and converted into an electrical value, after which this electrical value is amplified and modified in a predetermined way in an evaluation circuit and, finally, the output signal thus obtained controls a magnetic valve in the hydraulic actuation system.

As mentioned above, the circuit of the control system is connected to a voltage source not shown in the drawing, with the positive pole connected to the positive voltage bus 22, and the negative pole connected to the negative voltage bus 23. A stabilized voltage is obtained from this supply voltage with the negative pole likewise connected to the negative voltage bus 23, but with a stabilized positive potential available at the connection point 29, which in effect provides a stabilized voltage bus. The stabilized voltage is determined by the breakdown potential of the first Zener diode 25, which is supplied with current over the input series resistor 24. The stabilized voltage is supplied only to the regulating amplifier 16, so that inexpensive components with small power rating can be used for the series resistor 24, the first Zener diode 25 and the diode 26 connected in series with the Zener diode 25. The current which flows through the winding of the magnetic valve 21 is regulated in another way, as further described below.

The regulating transistor 33 is the active switching element in a comparison circuit. The potential on its emitter is affected by the input transducer means 11. A certain collector current then flows, and likewise a certain current to the base of the output transistor 36. The voltage drop across the emitter-resistor 38 of the output transistor 36 is fed back to the base of the regulating transistor 33, over the feedback connection 18. In this manner a stable condition is established, which depends upon and is analagous to the values prescribed by the input transducer means 11. The collector current of the output transistor 36 flows through the winding of the magnetic valve 21, the armature of which is displaced away from its rest position by an amount corresponding to the collector current of the output transistor 36.

The slider of the variable resistor 12 is directly controlled by the position of the throttle 62. The variable resistor 12 can be provided in the form of a multistep resistor comprising discrete individual resistances for a stepwise resistance variation characteristic, or as a wire wound potentiometer or a thick film potentiometer and/or a potentiometer with a resistor element of conductive plastic material. The variable resistance 12 forms a voltage divider together with the resistor 59, connected between the stabilized voltage bus 29 and the negative voltage bus 23. The emitter of the regulating transistor 33 is connected to the tap of this voltage divider 12,59. The emitter potential is therefore dependent upon the position of the slider 61 of the variable resistance 12, and hence dependent upon the position of the engine throttle 62. If a variable resistance of which the resistance value does not change linearally with the change of position of the slider 61 is used, or if a non-linear mechanical linkage is used between the throttle 62 and the slider 61, the translation characteristic of the input transducer of which the variable resistance 12 is a part can be made non-linear in a prescribed way. Such a non-linearity is generally desired in order to match the characteristic of the output current made available by the output transistor 36, and hence of the positioning of the armature of the magnetic valve 21, to the characteristics of the internal combustion engine and to those of the particular vehicle type.

The described non-linearity can also be obtained by the provision of non-linear switching elements in the evaluation circuit 15 or in non-linearity of the response of the armature of the magnetic valve 21 to the input power provided to its winding. In the embodiment illustrating the invention here described, use is made of the fact that the transistors 33 and 36 used in the evaluation circuit have non-linear response characteristics and, in addition, the voltage at the tap of the voltage divider formed by the variable resistor 12 and the resistance 59 has a non-linear relation to the position of the engine throttle 52. The non-linearity of the output transducer means 19 can be adjusted by the adjustment of the ferromagnetic path for the magnetic field of the magnetic valve 21.

Effects of change of the ambient temperature are reduced by temperature compensation provided within the circuit of the evaluation circuit means 15. The temperature dependent voltage changes produced by the first Zener diode 25 and in the diode 26 connected in its direction of easy conduction in series with the Zener diode 25 are equal and opposite over a wide range of temperature, so that the combined voltage drop across the diodes 25 and 26 remains substantially constant. The temperature dependent variation of the base-emitter voltage of the regulating transistor 33 is reduced by means of the network formed by the resistors 45, 41 and 42 and the third diode 44. The temperature dependence of the conduction voltage of the third diode 44 is made to balance the temperature dependence of the base-emitter voltage of the regulating transistor 33 by choice of the magnitude of the feedback resistor 42, across which the diode 44 is connected. The temperature dependent variation of the base-emitter voltage of the output transistor 36 is compensated by the current regulation arrangement next to be described.

The current through the magnetic valve 21, which is the collector current of the output transistor 36, needs to be regulated in order to make the force on the armature of the magnetic valve substantially independent of resistance changes in the winding of the magnetic valve 21 caused by temperature variations, as well as from other effects arising from switching circuits. The current flowing through the winding of the magnetic valve 21 flows, along with the base current of the output transistor 36, through the emitter-resistor 38 and produces a voltage drop there. This voltage drop is substantially proportional to the current through the winding of the magnetic valve 21. The voltage at the emitter of the output transistor 36 is fed back over the feedback path 18 to the base of the regulating transistor 33, and there compared with the potential at the tap of the voltage divider formed by the variable resistance 12 and the resistor 59, so as to hold the emitter current of the output transistor 36 closely proportional to the input voltage divider potential.

In electric power supplies, particularly those in motor vehicles, short period over-voltages are often produced by switching operations. Voltage peaks of this type reach a relatively high amplitude and can damage semiconductor circuit components. Such voltage peaks are kept out of the stabilized voltage at the connection point 29 by means of the input series resistor 24 and the capacitor 27. The output transistor 36 is less subject to damage by over-voltage peaks, because the inductivity of the winding of the magnetic valve 21 offers a relatively high impedance to voltage pulses. In addition, a second Zener diode 39 is provided which is connected in parallel with the collector-emitter path of the output transistor 36, so as to protect the output transistor 36 against the possibility of excessive collector-emitter voltages. Such unduly high voltage values can also be caused by the inductive kick voltage of the winding of the magnetic valve 21, when the magnetic valve current is abruptly cut down.

The possibility of a reversed misconnection of the voltage supply source to the evaluation circuit 15 is a risk of possible destruction of the semiconductor circuit components. In the circuit of this invention, this risk is avoided by the provision of the second Zener diode 28 and the second Zener diode 39. These diodes both conduct when the power supply is reversely connected. In this connection it is to be noted that the winding of the magnetic valve 21 is not provided with the conventional parallel connection of a reverse peak short-circuiting diode.

The magnetic valve 21 is preferably provided with a coating of a type favoring heat radiation. By the facilitation of heat radiation, it is possible to keep relatively small the physical dimensions of the winding of the magnetic valve 21 and also those of the magnetic valve as a whole.

The evaluation circuit 15 is so constituted that when the resistance value of the variable resistor 12 is at its maximum, the armature of the magnetic valve goes to a position in which the main control pressure also reaches its maximum. By this provision, the result is obtained that malfunctions resulting by lifting or poor connection of the slider 61, or by braking or a disconnection of the leads from the variable resistor 12 to the input terminals 31, the main control pressure will not be unduly reduced.

It is known that the armatures of magnetic valves have a certain friction hysteresis, because an absolute freedom of sliding motion is not obtainable and the armature tends to stick after a short period of rest. The friction hysteresis can be reduced, however, if the armature never comes to rest, but is continually subject to an oscillating movement, however small. In the control system of the present invention, the output transistor 36 is provided with an alternating voltage of small amplitude which superimposes an alternating current on the collector current of this output transistor. The ignition interruptor 51 of the engine provides a simple, cheap and already present source of alternating voltage. The interruptor pulses are coupled to the base connection of the output transistor 36, over a series combination of the capacitor 48 and the resistor 49, which is connected on the far side of the coupling resistor 37, from the base of the transistor 36. By means of a suitable dimensioning of the electrical magnitudes of the capacitor 48 and the resistor 49, the contribution of the alternating current to the collector current of the output transistor 36 can be readily set at a suitable value. The loading of the ignition system and the ignition interruptor 51 by the above-described connection to the evaluation circuit 15 is negligibly small. By the device of thus providing a supplementary alternating current to the evaluation circuit 15, it is possible to utilize magnetic valves with ordinary friction bearings (sliding bearings) instead of ball or roller bearings for control of the main hydraulic pressure of the automatic transmission.

The second and third input transducer elements and the associated inputs 52 and 57, respectively, of the evaluation circuit enable the evaluation circuit 15 to be interconnected for response to criteria developed by a system for purifying exhaust gases. Such criteria may be the spark retard or advance setting — obtained, for example, from the distributor of the ignition system — and also the amount of exhaust gas recycled. A measure for the amount of recycled exhaust gas can be provided by the position of a slide damper 67 that controls the recycling and is located in the feedback pipe 66, leading from the exhaust manifold 65 to the intake pipe. When either or both of the switches 13 and 14 is closed, the translation characteristic curve of the evaluation circuit 15 has a knee of predetermined form, as determined by the relative magnitudes of the voltage dividers 55,56 and 12,59 and the resistors 53 and 58.

The heat radiation-favoring coating of the magnetic valve can, for example be a suitable lacquer coating, such as a black lacquer coating. The magnetic valve is preferably a quick-acting valve, such as known types bored with holes providing oil pressure equalization.

Although the invention has been described with reference to a particular embodiment, it will be understood that variations and modifications may be made within the inventive concept.

I claim:

1. A control system for controlling the main control pressure of the automatic transmission of an internal combustion engine, comprising:
    a source of electric voltage;
    input transducer means (11) for converting mechanical position into electrical signals including a variable resistance, the ohmic value of which is controlled by the position of the engine throttle (62), said variable resistance (12) having a non-linear relation between resistance and throttle position, whereby said input transducer has a predetermined non-linear relation between input magnitude and output magnitude;
    amplifying evaluation circuit means (15) responsive to said input transducer means (11), and
    output transducer means (19) controlled by the electrical output of said evaluation circuit means (15) for mechanically controlling said main control pressure.

2. A control system for controlling the main control pressure of the automatic transmission of an internal combustion engine, comprising:
    a source of electric voltage;
    input transducer means (11) for converting mechanical position to electrical signals including a variable resistance, the ohmic value of which is controlled by the position of the engine throttle (62), the relation of resistance to throttle position of said variable resistance (12) being such as to provide a predetermined non-linear relation of the overall characteristic of said input transducer (11), evaluation circuit means (15) and output transducer (19) (throttle position to mechanical position of said output transducer).

3. A control system for controlling the main control pressure of the automatic transmission of an internal combustion engine, comprising:
    a source of electric voltage;
    input transducer means (11) for converting mechanical position to electrical signals including at least an element (12) providing an electrical signal corresponding to engine throttle position;
    amplifying evaluation circuit means (15) responsive to said input transducer means (11) comprising non-linear switching elements (33, 36) such as to provide a prescribed non-linear dependence of the output of said evaluation circuit upon the position of said engine throttle, and
    output transducer means (19) controlled by the electrical output of said evaluation circuit means (15) for mechanically controlling said main control pressure.

4. A control system for controlling the main control pressure of the automatic transmission of an internal combustion engine, comprising:
    a source of electric voltage;
    input transducer means (11) for converting mechanical position to electrical signals including at least an element (12) providing an electrical signal corresponding to engine throttle position;
    amplifying evaluation circuit means (15) responsive to said input transducer means (11), and
    output transducer means (19), controlled by the electrical output of said evaluation circuit means (15) for mechanically controlling said main control pressure and comprising a transducer element with a non-linear operating characteristic relation between input power and transducer mechanical position, such as to provide a predetermined non-linear dependence of output transducer mechanical position upon the position of said engine throttle.

5. A control system for controlling the main control pressure of the automatic transmission of an internal combustion engine, comprising:
    a source of electric voltage;
    input transducer means (11) for converting mechanical position to electrical signals including at least an element (12) providing an electrical signal corresponding to engine throttle position;
    amplifying evaluation circuit means (15) responsive to said input transducer means (11) and provided with voltage stabilization means for reducing the range of variations in its supply voltage, said voltage stabilization means including a series resistor (24) and a first Zener diode (25) connected in parallel to the electrical load of said voltage stabilization means, and
    output transducer means (19) controlled by the electrical output of said evaluation circuit means (15) for mechanically controlling said main control pressure.

6. A control system as defined in claim 5 in which said evaluation circuit means (15) contains a regulating transistor (3) and an output transistor (36) and is provided with temperature stabilization means for reducing the effects of ambient temperature variations, comprising a first diode (26) connected in series with said first Zener (25) and a second diode (28) connected in parallel to the series combination of said first diode and said first Zener diode and, further, a resistor (45) connected between said base electrode of said regulating transistor (33) and the output of said voltage stabilization means (29), two resistor elements (41,42) in series in a feedback connection from the emitter electrode of said output transistor (36) to the base electrode of said regulating transistor (33) and a third diode connected between the common connection (43) of said two resistors (41,42) and said base electrode of said regulating transistor (33).

7. A control system as defined in claim 6 in which, for further reduction of effects of temperature or source voltage variations, said output transistor (36) of said evaluation circuit means (15) is provided with an emitter resistor (38) and the base electrode of said output transistor (36) is connected over other circuit elements to the collector electrode of said regulating transistor (33).

8. A control system as defined in claim 5 in which said voltage stabilization means in said evaluation circuit means (15) includes a capacitor (27) connected across the output of said voltage stabilization means for reducing the effects of short-duration overvoltages.

9. A control system as defined in claim 5 in which said evaluation circuit means (15) includes an output transistor (36) and a second Zener diode (39) connected across the collector-emitter path of said output transistor (36) for mitigating effects of excessive supply voltage and/or off-switching transients of said output transducer (19).

10. A control system as defined in claim 5 in which said evaluation circuit means (15) contains an output transistor (36) and is provided with protection against reverse connection of the supply voltage comprising a second diode (28) connected across the output of said voltage stabilization means and also a second Zener diode (39) connected across the collector-emitter path of said output transistor (36).

11. A control system for controlling the main control pressure of the automatic transmission of an internal combustion engine, comprising:
   a source of electric voltage;
   input transducer means (11) for converting mechanical position to electrical signals including a variable resistance, the ohmic value of which is controlled by the position of the engine throttle (62);
   amplifying evaluation circuit means (15) responsive to said input transducer means (11), and
   output transducer means (19) controlled by the electrical output of said evaluation circuit means (15) for mechanically controlling said main control pressure,
   the resistance path of said variable resistance (12) being so connected to said evaluation circuit means (15) that upon interruption of one of the leads (31a, 31b, 61) of said variable resistance (12), said output transducer means (19) produces a maximum value of said control pressure.

12. A control system for controlling the main control pressure of the automatic transmission of an internal combustion engine, comprising:
   a source of electric voltage;
   input transducer means (11) for converting mechanical position to electrical signals including at least an element (12) providing an electrical signal corresponding to engine throttle position;
   amplifying evaluation circuit means (15) having a first input connected to said input transducer means (11) and having a second input (47) connected to a source of alternating voltage (51), and
   output transducer means (19) controlled by the electrical output of said evaluation circuit means (15) for mechanically controlling said main control pressure, an alternating motion being superimposed, as the result of said second input connection of said evaluation means, on the control motion of said output transducer means (19) to overcome the effect of friction hysteresis.

13. A control system as defined in claim 12 in which said source of alternating voltage is the interruptor (51) of the ignition system of said internal combustion engine.

14. A control system as defined in claim 12 in which said evaluation circuit means (15) includes an output transistor and in which said second input of said evaluation circuit means (15) comprises a series combination of a capacitor (48) and a resistor (49) interposed between the base of said output transistor and said source of alternating current (51).

15. A control system for controlling the main control pressure of the automatic transmission of an internal combustion engine, comprising:
   a source of electric voltage;
   input transducer means (11) for converting mechanical position to electrical signals including at least an element (12) providing an electrical signal corresponding to engine throttle position;
   amplifying evaluation circuit means (15) responsive to said input transducer means (11) and having a plurality of inputs, said input transducer means including at least one means for producing an additional output supplied to one of said inputs of said evaluation circuit means, said means for producing an additional output being connectible to a device for response to the chemical composition of the exhaust gases of said internal combustion engine, and
   output transducer means (19) controlled by the electrical output of said evaluation circuit means (15) for mechanically controlling said main control pressure.

16. A control system as defined in claim 15 in which said evaluation circuit means includes a first additional input (52) and a second additional input (52) comprises a first switch (13), the position of which is responsive to the degree of retard of the ignition timing of said internal combustion engine, said second additional input (57) comprising a second switch (14), the position of which is arranged to be responsive to a device (67) provided for control of the amount of exhaust gas recycled in said internal combustion engine.

17. A control system for controlling the main control pressure of the automatic transmission of an internal combustion engine, comprising:
   input transducer means (11) for converting mechanical position to electrical signals including at least an element (12) providing an electrical signal corresponding to engine throttle position;
   amplifying evaluation circuit means (15) responsive to said input transducer means (11), and
   output transducer means (19) controlled by the electrical output of said evaluation circuit means (15) for mechanically controlling said main control pressure and comprising a magnetic valve (21) of which the core and/or armature is or are provided with oil balance apertures for reduction of operating time.

18. A control system as defined in claim 17 in which said magnetic valve (21) is provided on its outer surface with a heat dissipation improving coating.

* * * * *